(12) United States Patent
Yang et al.

(10) Patent No.: US 8,057,892 B2
(45) Date of Patent: Nov. 15, 2011

(54) WOOD ADHESIVE AND METHOD OF PREPARING THEREOF

(76) Inventors: Guang Yang, Shanghai (CN); Bo Yang, Shanghai (CN)

( * ) Notice: Subject to any disclaimer, the term of this patent is extended or adjusted under 35 U.S.C. 154(b) by 0 days.

(21) Appl. No.: 12/821,169

(22) Filed: Jun. 23, 2010

(65) Prior Publication Data

US 2010/0258033 A1  Oct. 14, 2010

Related U.S. Application Data

(63) Continuation of application No. PCT/CN2008/073005, filed on Nov. 11, 2008.

(30) Foreign Application Priority Data

Jan. 4, 2008  (CN) .......................... 2008 1 0032289

(51) Int. Cl.
*C07K 1/00* (2006.01)
*C07K 17/00* (2006.01)

(52) U.S. Cl. .......................... 428/323; 530/370; 530/378

(58) Field of Classification Search ........................ None
See application file for complete search history.

(56) References Cited

U.S. PATENT DOCUMENTS 7,060,798 B2 * 6/2006 Li et al. .......................... 530/378

* cited by examiner

*Primary Examiner* — Sheeba Ahmed
(74) *Attorney, Agent, or Firm* — Matthias Scholl P.C.; Matthias Scholl

(57) ABSTRACT

A wood adhesive having a) 100 weight parts of water; b) between 3 and 45 weight parts of a proteinaceous material; c) between 0.01 and 15 weight parts of an acidity regulator; d) between 0.01 and 15 weight parts of an aromatic compound; e) between 0.01 and 15 weight parts of a curing agent; f) between 0.01 and 15 weight parts of a preservative; g) between 0 and 15 weight parts of a viscosity modifier; h) between 0 and 10 weight parts of a filler; and i) between 0 and 15 weight parts of a drier. The wood adhesive can be used for preparation of plywood, blockboard, oriented strand board (OSB), flakeboard, fiberboard, veneer plywood, middle density fiberboard, high density fiberboard, hardboard, flooring substrate, LVL, and so on. A method for preparing the wood adhesive is also provided.

33 Claims, No Drawings

WOOD ADHESIVE AND METHOD OF PREPARING THEREOF

CROSS-REFERENCE TO RELATED APPLICATIONS

This application is a continuation of International Patent Application No. PCT/CN2008/073005 with an international filing date of Nov. 11, 2008, designating the United States, now pending, and further claims priority benefits to Chinese Patent Application No. 200810032289.X filed Jan. 4, 2008. The contents of all of the aforementioned applications, including any intervening amendments thereto, are incorporated herein by reference.

BACKGROUND OF THE INVENTION

1. Field of the Invention

The invention relates to a wood adhesive and a method of preparing thereof.

2. Description of the Related Art

There are many types of wood adhesives currently known, among which urea-formaldehyde resin adhesive, phenolic resin adhesive, and melamine formaldehyde resin adhesive are dominant. However, upon production and application of plywood including these wood adhesives, formaldehyde, which is poisonous, will be released. The release period of formaldehyde is up to between 3 and 15 years.

For a newly-decorated house, formaldehyde cannot be evaporated completely within between 1 and 2 years, which results in a long-term high content of formaldehyde indoors and does harm to human health. Properties of urea-formaldehyde resin adhesive result in the inevitable release of free formaldehyde upon production of plywood. To reduce the content of formaldehyde in adhesives simply means weakening the bonding strength. Thus, in order to make the release of formaldehyde meet the E2, E1 or even E0 standard, many plywood producers passively deal with formaldehyde by masking, absorption, or blocking. Once the condition is mature, there is still a large amount of formaldehyde released. Although there are some formaldehyde-free wood adhesives, their hot water resistance is poor.

SUMMARY OF THE INVENTION

In view of the above-described problems, it is one objective of the invention to provide a wood adhesive that has good water resistance, particularly hot water resistance.

It is another objective of the invention to provide a method for preparing a wood adhesive that has good water resistance, particularly hot water resistance.

To achieve the above objectives, in accordance with one embodiment of the invention, there is provided a wood adhesive comprising a) 100 weight parts of water;
b) between 3 and 45 weight parts of a proteinaceous material;
c) between 0.01 and 15 weight parts of an acidity regulator;
d) between 0.01 and 15 weight parts of an aromatic compound;
e) between 0.01 and 15 weight parts of a curing agent;
f) between 0.01 and 15 weight parts of a preservative;
g) between 0 and 15 weight parts of a viscosity modifier;
h) between 0 and 10 weight parts of a filler; and
i) between 0 and 15 weight parts of a drier.

In a class of this embodiment, the proteinaceous material has more than 5 wt. % of protein, including but not limited to defatted soy flour, defatted soybean meal, soy protein isolate, defatted cottonseed meal, corn gluten meal, zein, wheat protein, cassava protein, peanut protein, rice protein, pea protein, lactalbumin, single cell protein, defatted rapeseed meal, fishmeal, gelatin, bone glue, meat and bone meal, defatted castor bean seed meal, skim milk powder, defatted whey powder, defatted egg powder, defatted peanut meal, feather protein, defatted meal mixture, yeast protein, an extract thereof, and a mixture thereof.

In a class of this embodiment, the acidity regulator is an organic acid, an organic acid salt, an organic acid anhydride, or a mixture thereof.

In a class of this embodiment, the acidity regulator is 1,2,3,4-butane tetracarboxylic acid, dodecanoic acid, citric acid, sodium citrate, malic acid, tartaric acid, fumaric acid, salicylic acid, fatty acid, quininic acid, butanedioic acid, itaconic acid, cis-butenedioic acid, trans-butenedioic acid, chloroacetic acid, mercaptoacetic acid, malonic acid, glutaric acid, α-ketoglutaric acid, EDTA, adipic acid, azelaic acid, pyruvic acid, decanedioic acid, lactic acid, oxalic acid, a salt thereof, an acid anhydride thereof, or a mixture thereof.

In a class of this embodiment, the aromatic compound is a tannic substance or has not more than five benzene rings.

In a class of this embodiment, the tannic substance is tannin or a tannin extract.

In a class of this embodiment, the aromatic compound comprising not more than three benzene rings is aromatic hydrocarbon, tea polyphenol, industrial phenol, trimethylphenol, diamino diphenyl sulfone, trimethylhydroquinone, 2-chloro-hydroquinone, p-tert-butyl-o-aminophenol, 3-chlorophenol, 4-tert-octylphenol, 2,4-diamino-phenol, 2-amino-4-nitrophenol, maltol, ethyl maltol, 2-(tert-butyl)-4,6-dimethylphenol, thymol, thiophenol, 2-bromothiophenol, thiosalicylic acid, alkyl phenol, 2-tert-butyl-4-methylphenol, 2-methoxy-5-nitrophenol, dihydroxytoluene, 2,5-di-tert-butylhydroquinone, (4-isopropyl)thiophenol, 3-fluoro-4-hydroxybenzonitrile, 2-fluorophenol, 4-fluorophenol, 2,6-dimethylphenol, 3,5-dimethylphenol, 2,3-dichlorophenol, sodium 5-nitroguaiacolate, 3,5-dimethylbenzoic acid, phenol, aniline, phthalic anhydride, benzenesulfonic acid, sodium benzenesulfonate, benzenesulfinic acid, sodium benzenesulfinate, styrene, xylene, 2,4-xylenesulfonic acid, ammonium xylenesulfonate, sodium xylenesulfonate, benzoic acid, sodium benzoate, toluene, pigment red 3, pigment red 13, pigment yellow 12, benzidine, nitrobenzene, dodecylbenzenesulphonic acid, sodium dodecylbenzenesulphonate, 3-nitro-o-xylene, dodecylbenzenesulphonic acid, sodium dodecylbenzenesulphonate, resorcine, m-phenylenediamine, metanilic acid, isophthalic acid, monosodium 5-sulfoisophthalate, sodium dimethyl m-phthalate 5-sulphonate, pyrocatechol, 1,2-dichlorobenzene, 2-chlorobenzaldehyde, 2-chlorobenzoic acid, sodium of o-chlorobenzoate, 2-chlorobenzoic acid, dimethyl phthalate, dibutyl phthalate, hydroquinone, p-xylene, 1,4-phthalaldehyde, terephthalic acid, para-phthalic sodium, dioctyl terephthalate, 4-chlorophenol, tosyl chloride, p-toluenesulfonic acid, sodium p-toluenesulfonate, p-toluidine, 1,4-benzoquinone, 4-hydroxybenzoic acid, sodium 4-hydroxybenzoate, 2-amino-4,6-dimethoxy phenyl pyrimidine, dicumyl peroxide, benzoyl peroxide, o-cresolsulfonic acid, bisphenol A, o-cresol, 3,4-dimethylphenol, 3,5-dimethylphenol, cresol, 1-naphthol, 2-naphthol, dinaphthol, pure m-cresol, 2,4-dichlorophenol, 2,6-dichlorophenol, 2,4,6-trichlorophenol, 4-chloro-3-methylphenol, 2,4-di-tert-butylphenol, 2,6-di-tert-butylphenol, 2,4-dinitrophenol, 2,4,6-tribromophenol, 2,6-dichloro-4-nitrophenol, o-cresol, m-cresol, p-cresol, 2-methyl-5-nitrophenol, 2-(1-methylpropyl)phenol, 4-tert-Butylcatechol, tert-butyl phenol, octylphenol, nonylphenol, 4,4'-biphenol, 4-nitrophenol, 3-nitrophenol, 2-nitrophenol, 4-bromophenol, 2-bromophenol, phenol ether carboxylate, m.p-cresol, phloroglucinol, 3-aminophenol, or a mixture thereof.

In a class of this embodiment, the curing agent is aluminium potassium sulfate dodecahydrate, ethylenediamine, diethylenetriaminepenta(methylene-phosphonic acid), triethylenetetramine, 1,4,7,10,13-pentaazatridecane, polyethylene-polyamines, 3-dimethylaminopropylamine, 3-diethylaminopropylamine, triethylamine, 1,6-hexanediamine, triethanolamine, 2-(2-aminoethylamino)ethanol, 1,3-bis(aminomethyl)benzene, decanedihydrazide, trimethyl hexamethylene diamine, imidazole, 2-methylimidazole, 2-ethylimidazole, 2-ethyl-4-ethyl imidazole, bicyclic amidine, hexamethylenetetramine, 1,2,4,5-benzenetetracarboxylic anhydride, 3,3',4,4'-benzophenonetetracarboxylic dianhydride, cyclopentane tetracarboxylic dianhydride, 1,2,4-benzenetricarboxylic anhydride, 2-dodecen-1-ylsuccinic anhydride, polyazelaic polyanhydride, polysebacic acid anhydride, himic anhydride, phthalic anhydride, 2-phenylimidazole, phthalic anhydride, cis-1,2,3,6-tetrahydrophthalic anhydride, hexahydrophthalic anhydride, sulfamic acid, maleic anhydride, polymaleic acid, tetrahydromethyl-1,3-isobenzofurandione, methylhexahydrophthalic anhydride, methyl-5-norbornene-2,3-dicarboxylic anhydride, dodecenylsuccinic anhydride, chlorendic anhydride, 1,2,4,5-benzenetetracarboxylic anhydride, benzophenonecarboxylic dianhydride, ethylene glycol trimellitic anhydride, methyl cyclohexene tetracarboxylic dianhydride, sulfuric acid, hydrochloric acid, calcium chloride, ammonium chloride, cobalt chloride, manganese chloride, ammonium sulfate, cuprous chloride, strontium chloride, aluminium chloride, cuprous chloride, zirconium oxychloride, ferrous chloride, ferric chloride, ammonium perchlorate, antimony trichloride, diphosphoryl chloride, phosphomolybdic acid, silicotungstic acid, heteropoly acid, ammonium silicotungstate, sodium silicotungstate, zirconium dioxide, titanium sulfate, magnesium chloride, molecular sieves, ceric sulfate, aluminium sulfate, ammonium thiosulfate, aluminium sulfate, aluminium potassium sulfate, aluminum ammonium sulfate, copper sulfate, ammonium ferric sulfate, nickel sulfate, potassium sulfate, sodium sulfate, sodium persulfate, sodium bisulfate, sodium sulfite, sodium bisulfite, ferric sulfate, ferrous sulfate, sodium dithionite, sodium metabisulfate, aluminum nitrate, ferric nitrate, cupric nitrate, aluminum dihydrogen phosphate, sodium dihydrogen phosphate, disodium hydrogenorthophosphate, potassium dihydrogen phosphate, dipotassium hydrogenphosphate, diammonium hydrogenphosphate, aluminium phosphate, sodium tripolyphosphate, sodium trimetaphosphate, sodium polyphosphate, sodium hypophosphite, ammonium hypophosphite, tetrasodium pyrophosphate, copper pyrophosphate, boric acid, sodium tetraborate, sodium thiocyanate, ammonium bromide, cupric bromide, cuprous bromide, hexamethylenetetramine, solid superacid, sodium fluotitanate, sodium fluorosilicate, sodium silicate, triiron tetraoxide, aluminium hydroxide, sodium tungstate, tungstic acid, calcium tungstate, potassium tungstate, phosphotungstic acid, sodium phosphotungstate, ammonium paratungstate, ammonium paratungstate, tungsten trioxide, sodium molybdate, ammonium molybdate, ammonium dimolybdate, ammonium tetramolybdate, ammonium heptamolybdate, ammonium octamolybdate, barium molybdate, molybdenum trioxide, molybdic acid, oxalyl chloride, phenylhydrazine hydrochloride, phenylhydrazine, thiourea dioxide, decabromodiphenyl oxide, tin tetrachloride, stannous chloride, tri((trimethylsilyl)methylene) tin chloride, cerous chloride, aluminium bromide, zinc methylsulfonate, anion exchange resin, cation exchange resin, n-butylpyridium chloride, 1-methylimidazole, 1-ethyl-3-methylimidazolium tetrafluoroborate, calcium gluconate, calcium naphthenate, pyrrolidone, ammonium hydrogen sulfate, ammonium ferric sulfate, ammonium ferrous sulfate, ammonium persulfate, ferric sulfate, potassium persulfate, sodium pyrosulfate, potassium pyrosulfate, potassium metabisulfite, magnesium nitrate, calcium lactate, calcium oxalate, calcium citrate, calcium malate, calcium tartrate, calcium hydrogenphosphate, calcium sulfate, calcium nitrate, ammonium dihydrogen phosphate, diammonium hydrogenphosphate, tri-ammonium orthophosphate, triammonium phosphate, calcium bicarbonate, ammonium carbonate, ammonium bicarbonate, sodium silicate, sodium dichromate, potassium dichromate, ammonium dichromate, or a mixture thereof.

In a class of this embodiment, the preservative is sorbic acid, potassium sorbate, phytic acid, methylparaben, ethylparaben, propylparaben, butylparaben, ethoxyguin, dehydroacetic acid, benzoic acid, sodium benzoate, propionic acid, sodium propionate, calcium dipropionate, kathon CG, fumaric acid, dimethyl fumarate, trichloroisocyanuric acid, sodium diacetate, dodecene dicyclohexylamine, benzotriazole, copper quinolate, glycolic acid, sodium pentachlorophenolate, sodium nitrite, sodium bisulfite, sodium sulfite, cresol, p-cumylphenol, potassium benzoate, 2,2-dibromo-2-cyanoacetamide, potassium permanganate, propionic acid potassium salt, dequalinium chloride, 1,2-propanediol, 1,4-dichlorobenzene, 2-oxetanone, dichlofluanid, dichlorophen, quintozine, dimethyl fumarate, salicylic acid, sodium acetate, ethoxyquin, 2-phenoxyethanol, ethylene oxide, sodium chlorite, folpet, sodium hypochlorite, formic acid, sodium lauroylsarcosinate, fthalide, fuberidazole, sodium mercaptobenzothiazole, 2-mercaptobenzothiazole, sodium perborate, furazolidone, sodium percarbonate, pentanedial, sodium salicylate sulfadimethoxine, glycin, sulfamethazine, glyoxal, sulfamerazine, sulfamethoxazole, guaiacol, sulfameter, sulfamonomethoxine, sulfisoxazole gantrisin, bromol, hexachlorophene, 2-(thiocyanatomethylthio)benzothiazole, trichlorophenol, hydrogen peroxide, DBDCB, thiabendazole, ambam, trisodium 4-carboxy-5-mercapto-3-hydroxy-isothiazole, anilazine, thiophanate-methyl, benomyl, tribromsalan, mancozeb, triclosan, maneb, mebenil, methamsodium, quinaldine, dithane Z-78, captafol, zinc his dimethyldithiocarbamate, captan, milneb, carbendazim, carboxin, NABAM, chloramphenicol, chlorotetracycline, cetrimonium pentachlorophenoxide, dihydrostreptomycin, lisozima, oxytetracycline, colistin sulfate, tetracycline, thiamphenicol, 5-chloro-2-methyl-4-isothiazolin-3-one, pentachlorophenol, chlorothalonil, pentachlorophenol copper, clotrimazole, isothiazolinones, dimethyloldimethyl hydantoin, 5-chloro-2-methyl-4-isothiazolin-3-one (CIT), 2-methyl-4-isothiazolin-3-one hydrochloride (MIT), nisin, or a mixture thereof.

In a class of this embodiment, the viscosity modifier is konjac glucomannan, xanthan gum, sodium alginate, hydroxypropyl starch, propyleneglycol alginate, gelatin, cyclohexapentylose, pectin, carrageenan, agar, gellan gum, arabic gum, tian-jing gum, carfopol resin, polyvinylpyrrolidone, dextrin, maltodextrin, chitosan, hydrolytic polymaleic anhydride, dimethyl sulfoxide, glycerol esters of wood rosin, glycerol esters of partially hydrogenated wood rosin, rosin modified maleic glyceride, hydrogenated rosin, polymerized rosin, disproportionated rosin, maleated rosin, rosin emulsion, petroleum resin emulsion, polyethylene wax, polyethylene glycol, polybutadiene, isocyanate, polyacrylamide, poly(vinyl alcohol), poly(1-butene), polyisobutylene, cellulose acetate butyrate, carboxymethyl cellulose, carboxymethylcellulose sodium, guar gum, or a mixture thereof.

In a class of this embodiment, the filler is diatomite, kaolin, bentonite, talcum powder, glass wool, rock wool, glass flour, sand, sawdust, silica fume, microsilica, silica micropowder, light calcium carbonate, activated clay, cellulose, titanium pigment, wood fiber, or a mixture thereof.

In a class of this embodiment, the drier is diethylene glycol, glycerin, acetone, methanol, ethanol, industrial alcohol, methyl acetate, ethyl acetate, n-butanol, isobutanol, benzoic sulfimide, or a mixture thereof.

In accordance with another embodiment of the invention, there is provided a method for preparing a wood adhesive comprising adding with stirring between 3 and 45 weight parts of a proteinaceous material, between 0.01 and 15 weight parts of an acidity regulator, between 0.01 and 15 weight parts of an aromatic compound, between 0.01 and 15 weight parts of a curing agent, between 0.01 and 15 weight parts of a preservative, between 0 and 15 weight parts of a viscosity modifier, between 0 and 10 weight parts of a filler, and between 0 and 15 weight parts of a drier to water.

In a class of this embodiment, the method comprises
a) adding between 0 and 15 weight parts of the viscosity regulator to water, heating to between 50 and 100° C., and stirring so that the acidity regulator is completely dissolved, swollen, or dispersed;
b) cooling to not more than 70° C.; and
c) adding with stirring between 3 and 45 weight parts of the proteinaceous material, between 0.01 and 15 weight parts of the acidity regulator, between 0.01 and 15 weight parts of the aromatic compound, between 0.01 and 15 weight parts of the curing agent, between 0.01 and 15 weight parts of the preservative, between 0 and 10 weight parts of the filler, and between 0 and 15 weight parts of the drier.

In a class of this embodiment, the method comprises
a) adding between 0 and 15 weight parts of the viscosity regulator to water, heating to between 10 and 100° C., and stirring so that the acidity regulator is completely dissolved, swollen, or dispersed;
b) cooling to not more than 70° C.; and
c) adding with stirring between 3 and 45 weight parts of the proteinaceous material, between 0.01 and 15 weight parts of the acidity regulator, between 0.01 and 15 weight parts of the aromatic compound, between 0.01 and 15 weight parts of the curing agent, between 0.01 and 15 weight parts of the preservative, between 0 and 10 weight parts of the filler, and between 0 and 15 weight parts of the drier.

In a class of this embodiment, the method further comprises homogenizing a resultant wood adhesive by a colloid mill and/or a homogenizer into an aqueous solution, and spray drying the aqueous solution to yield a powder.

In a class of this embodiment, the proteinaceous material has more than 5 wt. % of protein, including but not limited to defatted soy flour, defatted soybean meal, soy protein isolate, defatted cottonseed meal, corn gluten meal, zein, wheat protein, cassava protein, peanut protein, rice protein, pea protein, lactalbumin, single cell protein, defatted rapeseed meal, fishmeal, gelatin, bone glue, meat and bone meal, defatted castor bean seed meal, skim milk powder, defatted whey powder, defatted egg powder, defatted peanut meal, feather protein, defatted meal mixture, yeast protein, an extract thereof, and/or a mixture thereof.

In a class of this embodiment, the proteinaceous material comprises one or more of the following: defatted soy flour, defatted soybean meal, soy protein isolate, defatted cottonseed meal, corn gluten meal, zein, wheat protein, cassava protein, peanut protein, rice protein, pea protein, lactalbumin, single cell protein, defatted rapeseed meal, fishmeal, gelatin, bone glue, meat and bone meal, defatted castor bean seed meal, skim milk powder, defatted whey powder, defatted egg powder, defatted peanut meal, feather protein, defatted meal mixture, yeast protein, an extract thereof, and/or a mixture thereof.

In a class of this embodiment, the acidity regulator is an organic acid, an organic acid salt, an organic acid anhydride, or a mixture thereof.

In a class of this embodiment, the acidity regulator is 1,2, 3,4-butane tetracarboxylic acid, dodecanoic acid, citric acid, sodium citrate, malic acid, tartaric acid, fumaric acid, salicylic acid, fatty acid, quininic acid, butanedioic acid, itaconic acid, cis-butenedioic acid, trans-butenedioic acid, chloroacetic acid, mercaptoacetic acid, malonic acid, glutaric acid, α-ketoglutaric acid, EDTA, adipic acid, azelaic acid, pyruvic acid, decanedioic acid, lactic acid, oxalic acid, a salt thereof, an acid anhydride thereof, or a mixture thereof.

In a class of this embodiment, the aromatic compound is a tannic substance or has not more than three benzene rings.

In a class of this embodiment, the tannic substance is tannin or a tannin extract.

In a class of this embodiment, the aromatic compound comprising not more than three benzene rings is aromatic hydrocarbon, tea polyphenol, industrial phenol, trimethylphenol, diamino diphenyl sulfone, trimethylhydroquinone, 2-chloro-hydroquinone, p-tert-butyl-o-aminophenol, 3-chlorophenol, 4-tert-octylphenol, 2,4-diamino-phenol, 2-amino-4-nitrophenol, maltol, ethyl maltol, 2-(tert-butyl)-4,6-dimethylphenol, thymol, thiophenol, 2-bromothiophenol, thiosalicylic acid, alkyl phenol, 2-tert-butyl-4-methylphenol, 2-methoxy-5-nitrophenol, dihydroxytoluene, 2,5-di-tert-butylhydroquinone, (4-isopropyl)thiophenol, 3-fluoro-4-hydroxybenzonitrile, 2-fluorophenol, 4-fluorophenol, 2,6-dimethylphenol, 3,5-dimethylphenol, 2,3-dichlorophenol, sodium 5-nitroguaiacolate, 3,5-dimethylbenzoic acid, phenol, aniline, phthalic anhydride, benzenesulfonic acid, sodium benzenesulfonate, benzenesulfinic acid, sodium benzenesulfinate, styrene, xylene, 2,4-xylenesulfonic acid, ammonium xylenesulfonate, sodium xylenesulfonate, benzoic acid, sodium benzoate, toluene, pigment red 3, pigment red 13, pigment yellow 12, benzidine, nitrobenzene, dodecylbenzenesulphonic acid, sodium dodecylbenzenesulphonate, 3-nitro-o-xylene, dodecylbenzenesulphonic acid, sodium dodecylbenzenesulphonate, resorcine, m-phenylenediamine, metanilic acid, isophthalic acid, monosodium 5-sulfoisophthalate, sodium dimethyl m-phthalate 5-sulphonate, pyrocatechol, 1,2-dichlorobenzene, 2-chlorobenzaldehyde, 2-chlorobenzoic acid, sodium of o-chlorobenzoate, 2-chlorobenzoic acid, dimethyl phthalate, dibutyl phthalate, hydroquinone, p-xylene, 1,4-phthalaldehyde, terephthalic acid, para-phthalic sodium, dioctyl terephthalate, 4-chlorophenol, tosyl chloride, p-toluenesulfonic acid, sodium p-toluenesulfonate, p-toluidine, 1,4-benzoquinone, 4-hydroxybenzoic acid, sodium 4-hydroxybenzoate, 2-amino-4, 6-dimethoxy phenyl pyrimidine, dicumyl peroxide, benzoyl peroxide, o-cresolsulfonic acid, bisphenol A, o-cresol, 3,4-dimethylphenol, 3,5-dimethylphenol, cresol, 1-naphthol, 2-naphthol, dinaphthol, pure m-cresol, 2,4-dichlorophenol, 2,6-dichlorophenol, 2,4,6-trichlorophenol, 4-chloro-3-methylphenol, 2,4-di-tert-butylphenol, 2,6-di-tert-butylphenol, 2,4-dinitrophenol, 2,4,6-tribromophenol, 2,6-dichloro-4-nitrophenol, o-cresol, m-cresol, p-cresol, 2-methyl-5-nitrophenol, 2-(1-methylpropyl)phenol, 4-tert-Butylcatechol, tert-butyl phenol, octylphenol, nonylphenol, 4,4'-biphenol, 4-nitrophenol, 3-nitrophenol, 2-nitrophenol, 4-bromophenol, 2-bromophenol, phenol ether carboxylate, m.p-cresol, phloroglucinol, 3-aminophenol, or a mixture thereof.

In a class of this embodiment, the curing agent is aluminium potassium sulfate dodecahydrate, ethylenediamine, diethylenetriaminepenta(methylene-phosphonic acid), triethylenetetramine, 1,4,7,10,13-pentaazamidecane, polyethylene-polyamines, 3-dimethylaminopropylamine, 3-diethylaminopropylamine, triethylamine, 1,6-hexanediamine, triethanolamine, 2-(2-aminoethylamino)ethanol, 1,3-bis(aminomethyl)benzene, decanedihydrazide, trimethyl hexamethylene diamine, imidazole, 2-methylimidazole, 2-ethylimidazole, 2-ethyl-4-ethyl imidazole, bicyclic amidine, hexamethylenetetramine, 1,2,4,5-benzenetetracarboxylic anhydride, 3,3',4,4'-benzophenonetetracarboxylic dianhydride, cyclopentane tetracarboxylic dianhydride, 1,2,4-benzenetricarboxylic anhydride, 2-dodecen-1-ylsuccinic anhydride, polyazelaic polyanhydride, polysebacic acid anhydride, himic anhydride, phthalic anhydride, 2-phenylimidazole, phthalic anhydride, cis-1,2,3,6-tetrahydrophthalic anhydride, hexahydrophthalic anhydride, sulfamic acid, maleic anhydride, polymaleic acid, tetrahydromethyl-1,3-isobenzofurandione, methylhexahydrophthalic anhydride, methyl-5-norbornene-2,3-dicarboxylic anhydride, dodecenylsuccinic anhydride, chlorendic anhydride, 1,2,4,5-benzenetetracarboxylic anhydride, benzophenonecarboxylic dianhydride, ethylene glycol trimellitic anhydride, methyl cyclohexene tetracarboxylic dianhydride, sulfuric acid, hydrochloric acid, calcium chloride, ammonium chloride, cobalt chloride, manganese chloride, ammonium sulfate, cuprous chloride, strontium chloride, aluminium chloride, cuprous chloride, zirconium oxychloride, ferrous chloride, ferric chloride, ammonium perchlorate, antimony trichloride, diphosphoryl chloride, phosphomolybdic acid, silicotungstic acid, heteropoly acid, ammonium silicotungstate, sodium silicotungstate, zirconium dioxide, titanium sulfate, magnesium chloride, molecular sieves, ceric sulfate, aluminium sulfate, ammonium thiosulfate, aluminium sulfate, aluminium potassium sulfate, aluminum ammonium sulfate, copper sulfate, ammonium ferric sulfate, nickel sulfate, potassium sulfate, sodium sulfate, sodium persulfate, sodium bisulfate, sodium sulfite, sodium bisulfite, ferric sulfate, ferrous sulfate, sodium dithionite, sodium metabisulfite, aluminum nitrate, ferric nitrate, cupric nitrate, aluminum dihydrogen phosphate, sodium dihydrogen phosphate, disodium hydrogenorthophosphate, potassium dihydrogen phosphate, dipotassium hydrogenphosphate, diammonium hydrogenphosphate, aluminium phosphate, sodium tripolyphosphate, sodium trimetaphosphate, sodium polyphosphate, sodium hypophosphite, ammonium hypophosphite, tetrasodium pyrophosphate, copper pyrophosphate, boric acid, sodium tetraborate, sodium thiocyanate, ammonium bromide, cupric bromide, cuprous bromide, hexamethylenetetramine, solid superacid, sodium fluotitanate, sodium fluorosilicate, sodium silicate, triiron tetraoxide, aluminium hydroxide, sodium tungstate, tungstic acid, calcium tungstate, potassium tungstate, phosphotungstic acid, sodium phosphotungstate, ammonium paratungstate, ammonium paratungstate, tungsten trioxide, sodium molybdate, ammonium molybdate, ammonium dimolybdate, ammonium tetramolybdate, ammonium heptamolybdate, ammonium octamolybdate, barium molybdate, molybdenum trioxide, molybdic acid, oxalyl chloride, phenylhydrazine hydrochloride, phenylhydrazine, thiourea dioxide, decabromodiphenyl oxide, tin tetrachloride, stannous chloride, tri((trimethylsilyl)methylene) tin chloride, cerous chloride, aluminium bromide, zinc methylsulfonate, anion exchange resin, cation exchange resin, n-butylpyridium chloride, 1-methylimidazole, 1-ethyl-3-methylimidazolium tetrafluoroborate, calcium gluconate, calcium naphthenate, pyrrolidone, ammonium hydrogen sulfate, ammonium ferric sulfate, ammonium ferrous sulfate, ammonium persulfate, ferric sulfate, potassium persulfate, sodium pyrosulfate, potassium pyrosulfate, potassium metabisulfite, magnesium nitrate, calcium lactate, calcium oxalate, calcium citrate, calcium malate, calcium tartrate, calcium hydrogenphosphate, calcium sulfate, calcium nitrate, ammonium dihydrogen phosphate, diammonium hydrogenphosphate, tri-ammonium orthophosphate, triammonium phosphate, calcium bicarbonate, ammonium carbonate, ammonium bicarbonate, sodium silicate, sodium dichromate, potassium dichromate, ammonium dichromate, or a mixture thereof.

In a class of this embodiment, the preservative is sorbic acid, potassium sorbate, phytic acid, methylparaben, ethylparaben, propylparaben, butylparaben, ethoxyguin, dehydroacetic acid, benzoic acid, sodium benzoate, propionic acid, sodium propionate, calcium dipropionate, kathon CG, fumaric acid, dimethyl fumarate, trichloroisocyanuric acid, sodium diacetate, dodecene dicyclohexylamine, benzotriazole, copper quinolate, glycolic acid, sodium pentachlorophenolate, sodium nitrite, sodium bisulfite, sodium sulfite, cresol, p-cumylphenol, potassium benzoate, 2,2-dibromo-2-cyanoacetamide, potassium permanganate, propionic acid potassium salt, dequalinium chloride, 1,2-propanediol, 1,4-dichlorobenzene, 2-oxetanone, dichlofluanid, dichlorophen, quintozine, dimethyl fumarate, salicylic acid, sodium acetate, ethoxyquin, 2-phenoxyethanol, ethylene oxide, sodium chlorite, folpet, sodium hypochlorite, formic acid, sodium lauroylsarcosinate, fthalide, fuberidazole, sodium mercaptobenzothiazole, 2-mercaptobenzothiazole, sodium perborate, furazolidone, sodium percarbonate, pentanedial, sodium salicylate sulfadimethoxine, glycin, sulfamethazine, glyoxal, sulfamerazine, sulfamethoxazole, guaiacol, sulfameter, sulfamonomethoxine, sulfisoxazole gantrisin, bromol, hexachlorophene, 2-(thiocyanatomethylthio)benzothiazole, trichlorophenol, hydrogen peroxide, DBDCB, thiabendazole, ambam, trisodium 4-carboxy-5-mercapto-3-hydroxyisothiazole, anilazine, thiophanate-methyl, benomyl, tribromsalan, mancozeb, triclosan, maneb, mebenil, methamsodium, quinaldine, dithane Z-78, captafol, zinc his dimethyldithiocarbamate, captan, milneb, carbendazim, carboxin, NABAM, chloramphenicol, chlorotetracycline, cetrimonium pentachlorophenoxide, dihydrostreptomycin, lisozima, oxytetracycline, colistin sulfate, tetracycline, thiamphenicol, 5-chloro-2-methyl-4-isothiazolin-3-one, pentachlorophenol, chlorothalonil, pentachlorophenol copper, clotrimazole, isothiazolinones, dimethyloldimethyl hydantoin, 5-chloro-2-methyl-4-isothiazolin-3-one (CIT), 2-methyl-4-isothiazolin-3-one hydrochloride (MIT), nisin, or a mixture thereof.

In a class of this embodiment, the viscosity modifier is konjac glucomannan, xanthan gum, sodium alginate, hydroxypropyl starch, propyleneglycol alginate, gelatin, cyclohexapentylose, pectin, carrageenan, agar, gellan gum, arabic gum, tian-jing gum, carfopol resin, polyvinylpyrrolidone, dextrin, maltodextrin, chitosan, hydrolytic polymaleic anhydride, dimethyl sulfoxide, glycerol esters of wood rosin, glycerol esters of partially hydrogenated wood rosin, rosin modified maleic glyceride, hydrogenated rosin, polymerized rosin, disproportionated rosin, maleated rosin, rosin emulsion, petroleum resin emulsion, polyethylene wax, polyethylene glycol, polybutadiene, isocyanate, polyacrylamide, poly(vinyl alcohol), poly(1-butene), polyisobutylene, cellulose acetate butyrate, carboxymethyl cellulose, carboxymethylcellulose sodium, guar gum, or a mixture thereof.

In a class of this embodiment, the filler is diatomite, kaolin, bentonite, talcum powder, glass wool, rock wool, glass flour, sand, sawdust, silica fume, microsilica, silica micropowder, light calcium carbonate, activated clay, cellulose, titanium pigment, wood fiber, or a mixture thereof.

In a class of this embodiment, the drier is diethylene glycol, glycerin, acetone, methanol, ethanol, industrial alcohol, methyl acetate, ethyl acetate, n-butanol, isobutanol, benzoic sulfimide, or a mixture thereof.

In a class of this embodiment, a granularity of the proteinaceous material is between 30 and 200 mesh.

In a class of this embodiment, the stir speed is between 10 and 200 rpm.

In a class of this embodiment, the drier can accelerate the drying rate of an adhesive coating. The mechanism lies in that the drier has low boiling point and when mixed with water to yield a mixture having low azeotropic point. Water in the mixture, even at low temperature, can be volatilized or evaporated. Thus, water in the adhesive is decreased and the drying rate accelerated.

In a class of this embodiment, the curling agent can accelerate the curing of adhesives, reduce the curing temperature, and improve the properties of hot water resistance.

Advantages of the invention are summarized below:
1) no or almost no formaldehyde is released upon production and application of plywood comprising the wood adhesive, so human health is unaffected;
2) plywood comprising the wood adhesive has high water resistance and even can reach the standard of grade I and grade II;
3) the wood adhesive can be saved at room temperature and the shelf life thereof can last for one year without cold storage, while the shelf life of urea-formaldehyde resin adhesive is just 6 months even with cold storage;
4) the wood adhesive can be used for preparation of almost all man-made panels including but not limited to plywood, blockboard, oriented strand board (OSB), flakeboard, fiberboard, veneer plywood, middle density fibreboard, high density fibreboard, hardboard, flooring substrate, LVL; and
5) the curing temperature of the wood adhesive is 110° C. or more, which is beneficial to use.

DETAILED DESCRIPTION OF THE EMBODIMENTS

For further illustrating the invention, experiments detailing a wood adhesive and a method of preparing thereof are described below. It should be noted that the following examples are intended to describe and not to limit the invention.

Example 1

To a vessel equipped with a stirrer, 100 g of water was added and then 24 g of defatted cottonseed meal powder which had been ground to more than 80 mesh was further added with stirring at between 50 and 200 rpm for about between 20 and 60 min to yield a homogenate. To the homogenate, 8 g of butane tetracarboxylic acid was added and stirred for between about 5 and 20 min for dissolution, 2 g of resorcine added and stirred for between 10 and 30 min, 5 g of ammonium chloride added and stirred for between 10 and 30 min, 0.13 g of potassium sorbate added and stirred for between 10 and 20 min, 5 g of diatomite added and stirred uniformly, and 5 g of acetone added and stirred for 10 and 20 min. Finally, a wood adhesive was obtained.

Example 2

The process was basically the same as that in Example 1 except that: after 100 g water was added to the vessel, 0.3 g of xanthan gum was added with stirring; the mixture was heated to 100° C. and stirred for between 20 and 120 min for dissolution, and then was cooled to not more than 70° C. Subsequently, the materials of Example 1 were added respectively. The resultant solution was homogenized by a colloid mill and a homogenizer to yield a wood adhesive. The addition of xanthan gum could increase the viscosity of the wood adhesive.

Example 3

To a vessel equipped with a stirrer, 100 g of water was added and then 14 g of soy protein isolate which had been ground to more than 80 mesh was further added with stirring at between 50 and 200 rpm for about between 20 and 60 min to yield a homogenate. To the homogenate, 8 g of citric acid was added and stirred for between about 5 and 20 min for dissolution, 12 g of ethylparaben added and stirred for between 10 and 30 min, 8 g of potassium pyrosulfate added with stirring, and 8 g of maltol added and stirred. The resultant solution was homogenized by a colloid mill and a homogenizer and dried by spraying to yield a wood adhesive.

Example 4

To a vessel equipped with a stirrer and having 100 g of water, 4 g of guar gum was added with stirring at between 50 and 200 rpm, heated, and 15 g of glutin which had been ground to more than 60 mesh further added to yield a homogenate. The homogenate was cooled to not more than 70° C., and 3 g of tartaric acid was added and stirred for between about 5 and 20 min for dissolution, 15 g of a tannin extract added and stirred for between 10 and 30 min, 0.05 g of sodium sulfite added and stirred for between 10 and 20 min, 2 g of propionic acid added and stirred for between 10 and 20 min, 10 g of kaolin added and stirred, and 3 g of glycerin added and stirred for 10 and 20 min. Finally, a wood adhesive was obtained.

Example 5

To a vessel equipped with a stirrer, 100 g of water was added and then 30 g of defatted peanut meal powder which had been ground to more than 40 mesh was further added with stirring at between 50 and 200 rpm for about between 20 and 60 min to yield a homogenate. To the homogenate, 15 g of glutaric acid was added and stirred for between about 5 and 20 min for dissolution, 10 g of sodium dihydrogen phosphate added and stirred for between 5 and 20 min, 10 g of phenol added and stirred for between 10 and 30 min, 0.5 g of benzoic acid added and stirred for between 10 and 20 min, and 0.1 g of ethyl acetate added and stirred for 10 and 20 min. The resultant solution was homogenized by a colloid mill and a homogenizer to yield a wood adhesive.

Example 6

To a vessel equipped with a stirrer, 100 g of water was added and heated to more than 50° C., and then 7 g of carfopol resin and 8 g of sesbania gum were further added with stirring at between 50 and 200 rpm for dissolution. The mixture was cooled to room temperature, and 24 g of a mixture consisting of defatted soybean meal and bone glue which had been ground to more than 40 mesh was added with stirring for about 20 and 60 min to yield a homogenate. To the homogenate, 10 g of lactic acid was added and stirred for between about 5 and 20 min for dissolution, 10 g of sodium dodecyl benzene sulfonate added and stirred for between 10 and 30 min, 3 g of sodium benzoate added and stirred for between 10 and 20 min, and 2 g of talcum powder and 4 g of rock wool powder added and stirred. The resultant solution was homogenized by a colloid mill and a homogenizer and dried by spraying to yield a wood adhesive.

Example 7

To a vessel equipped with a stirrer and having 100 g of water, 8 g of polyvinyl alcohol was added, heated, and stirred. The solution was cooled and then 5 g of defatted soy meal flour which had been ground to more than 80 mesh was added with stirring for about between 20 and 60 min to yield a homogenate. To the homogenate, 14 g of soy protein isolate was added and stirred for between about 10 and 40 min for dissolution, 4 g of tannin added and stirred for between 10 and 30 min, 5 g of citric acid added and stirred for between 5 and 20 min, 5 g of sodium hypophosphite added and stirred for between 10 and 60 min, 5 g of salicylic acid added and stirred for 10 and 30 min, and 0.3 g of sodium tetraborate added and stirred for between 10 and 60 min. Finally, a wood adhesive was obtained.

Example 8

To a vessel equipped with a stirrer, 100 g of water was added and then 34 g of a mixture consisting of defatted castor meal and skim milk powder which had been ground to more than 150 mesh was further added with stirring at between 50 and 200 rpm for about between 20 and 60 min to yield a homogenate. To the homogenate, 3 g of quinic acid and 5 g of malonic acid were added and stirred for between about 5 and 20 min for dissolution, 4 g of tannin and 5 g of maltol added and stirred for between 10 and 30 min, 0.3 g of sodium bisulfate and 0.5 g of ferric sulfate added and stirred for between 10 and 20 min, 5 g of a mixture consisting of xanthan gum and pectin added and stirred for between 10 and 60 min, 1 g of glass dust added and stirred, and 11 g of diethylene glycol for 10 and 20 min. The resultant solution was homogenized by a colloid mill and a homogenizer to yield a wood adhesive.

Example 9

To a vessel equipped with a stirrer, 100 g of water was added and then 15 g of a mixture consisting of defatted castor meal and skim milk powder which had been ground to more than 40 mesh was further added with stirring at between 50 and 200 rpm for about between 20 and 60 min to yield a homogenate. To the homogenate, 4 g of itaconic acid and 4 g of quinic acid were added and stirred for between about 5 and 20 min for dissolution, 5 g of resorcino and 3 g of dimethyl phthalate added and stirred for between 10 and 30 min, 0.3 g of sodium bisulfate and 4 g of sodium silicate added and stirred for between 10 and 20 min, 3 g of dimethyl sulphoxide and 5 g of polyvinylpyrrolidone added and stirred for between 10 and 60 min, 1 g of glass dust added and stirred, cooled to room temperature, and 10 g of ethyl acetate added. The resultant solution was homogenized to yield a wood adhesive.

Compared with the wood adhesive obtained in Example 8, the resultant wood adhesive could be adjustable in viscosity (between 0.001 and 1.600 Pa·s) and met the requirement of pre-pressing strength of plywood, meanwhile the curing temperature thereof was between 110 and 220° C., which benefited its use.

Examples 10-14

The process was the same as the above-mentioned examples and the materials and the usage amount thereof are listed in Tables 1-2.

TABLE 1

Usage amount of materials in Examples 10-14

| Example | Water (g) | Proteinaceous material (g) | Acidity regulator (g) | Aromatic compound (g) | Curing agent (g) | Preservative (g) | Viscosity modifier (g) | Filler (g) | Drier (g) |
|---|---|---|---|---|---|---|---|---|---|
| 10 | 100 | 8 | 0.01 | 15 | 10 | 7 | 0.1 | 9 | 0.1 |
| 11 | 100 | 12 | 1 | 0.1 | 1.5 | 15 | 0 | 0.8 | 3 |
| 12 | 100 | 25 | 12 | 6 | 5 | 11 | 1 | 7 | 0 |
| 13 | 100 | 33 | 5 | 2.5 | 2 | 2 | 14 | 8 | 14 |
| 14 | 100 | 45 | 3 | 10 | 0.1 | 0.5 | 8 | 0 | 9 |

TABLE 2

Material list in Examples 10-14

| | Example 10 | Example 11 | Example 12 | Example 13 | Example 14 |
|---|---|---|---|---|---|
| Water | Water | Water | Water | Water | Water |
| Proteinaceous material | Rice protein | 25 wt. % of single cell protein and 75 wt. % of defatted egg powder | Animal meat and bone meal | 50 wt. % of defatted whey powder and 50 wt. % of corn protein powder | 30 wt. % of bone glue and 70 wt. % of skimmed milk powder |
| Acidity regulator | Lauric acid | 40 wt. % of tartaric acid and 60 wt. % of malonic acid | 50 wt. % of glutaric acid and 50 wt. % of sodium citrate | Pyruvic acid | 50 wt. % of malic acid and 50 wt. % of azelaic acid |

TABLE 2-continued

Material list in Examples 10-14

| | Example 10 | Example 11 | Example 12 | Example 13 | Example 14 |
|---|---|---|---|---|---|
| Aromatic compound | 35 wt. % of thymol and 65 wt. % of dinaphthol | Octylphenol | m-Nitrophenol | 50 wt. % of p-chlorophenol and 50 wt. % of catechol | 20 wt. % of dihydroxytoluene and 80 wt. % of xylene |
| Curing agent | Triethylamin | 50 wt. % of triethylenetetramine and 50 wt. % of 3,3',4,4'-benzophenonetetracarboxylic dianhydride | 30 wt. % of 2-dodecen-1-ylsuccinic anhydride and 70 wt. % of decanedihydrazide | Chlorendic anhydride | Ammonium perchlorate |
| Preservative | Dichlofluanid | 30 wt. % of salicylanilide and 70 wt. % of folpet | Ethoxy quinoline | 50 wt. % of fumaric acid and 50 wt/% of sulfisoxazole gantrisin | Glycidol |
| Viscosity modifier | Dimethyl sulfoxide | Petroleum resin emulsion | 50 wt. % of polyethylene wax and 50 wt. % of chitosan | 30 wt. % of hydrogenated rosin and 70 wt. % of glycerol ester of wood rosin | Dextrin |
| Filler | Activated clay | 50 wt. % of cellulose and 50 wt. % of kaolin | Titanium dioxide | Talcum powder | Silicon powder |
| Drier | Glycerin | Methyl acetate | Methanol | 10 wt. % of diethylene glycol and 90 wt. % of ethanol | Acetone |

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A wood adhesive, comprising:
   a) 100 weight parts of water;
   b) between 3 and 45 weight parts of a proteinaceous material;
   c) between 0.01 and 15 weight parts of an acidity regulator;
   d) between 0.01 and 15 weight parts of an aromatic compound;
   e) between 0.01 and 15 weight parts of a curing agent;
   f) between 0.01 and 15 weight parts of a preservative;
   g) between 0 and 15 weight parts of a viscosity modifier;
   h) between 0 and 10 weight parts of a filler;
   i) between 0 and 15 weight parts of a drier;
wherein
   said aromatic compound is a tannin, a tannin extract, resorcine, maltol, phenol, sodium dodecyl benzene sulfonate, resorcino, dimethyl phthalate, thymol, dinaphthol, octylphenol, m-nitrophenol, p-chlorophenol, catechol, dihydroxytoluene, xylene, or a mixture thereof; and
   said curing agent is ammonium chloride, potassium pyrosulfate, sodium sulfite, sodium dihydrogen phosphate, sodium tetraborate, sodium hypophosphite, sodium bisulfate, ferric sulfate, sodium silicate, triethylamine, 3,3',4,4'-benzophenonetetracarboxylic dianhydride, 2-dodecen-1-ylsuccinic anhydride, decanedihydrazide, chlorendic anhydride, ammonium perchlorate, or a mixture thereof.

2. The wood adhesive of claim 1, wherein said proteinaceous material comprises more than 5 wt. % of protein, and said proteinaceous material is defatted soy flour, defatted soybean meal, soy protein isolate, defatted cottonseed meal, corn gluten meal, zein, wheat protein, cassava protein, peanut protein, rice protein, pea protein, lactalbumin, single cell protein, defatted rapeseed meal, fishmeal, gelatin, bone glue, meat and bone meal, defatted castor bean seed meal, skim milk powder, defatted whey powder, defatted egg powder, defatted peanut meal, feather protein, defatted meal mixture, yeast protein, an extract thereof, or a mixture thereof.

3. The wood adhesive of claim 1, wherein said acidity regulator is an organic acid, an organic acid salt, an organic acid anhydride, or a mixture thereof.

4. The wood adhesive of claim 3, wherein said acidity regulator is 1,2,3,4-butane tetracarboxylic acid, dodecanoic acid, citric acid, sodium citrate, malic acid, tartaric acid, fumaric acid, salicylic acid, fatty acid, quininic acid, butanedioic acid, itaconic acid, cis-butenedioic acid, trans-butenedioic acid, chloroacetic acid, mercaptoacetic acid, malonic acid, glutaric acid, α-ketoglutaric acid, EDTA, adipic acid, azelaic acid, pyruvic acid, decanedioic acid, lactic acid, oxalic acid, a salt thereof, an acid anhydride thereof, or a mixture thereof.

5. The wood adhesive of claim 1, wherein said preservative is sorbic acid, potassium sorbate, phytic acid, methylparaben, ethylparaben, propylparaben, butylparaben, ethoxyguin, dehydroacetic acid, benzoic acid, sodium benzoate, propionic acid, sodium propionate, calcium dipropionate, kathon CG, fumaric acid, dimethyl fumarate, trichloroisocyanuric acid, sodium diacetate, dodecene dicyclohexylamine, benzotriazole, copper quinolate, glycolic acid, sodium pentachlorophenolate, sodium nitrite, sodium bisulfite, sodium sulfite, cresol, p-cumylphenol, potassium benzoate, 2,2-dibromo-2-cyanoacetamide, potassium permanganate, propionic acid potassium salt, dequalinium chloride, 1,2-propanediol, 1,4-dichlorobenzene, 2-oxetanone, dichlofluanid, dichlorophen, quintozine, dimethyl fumarate, salicylic acid, sodium acetate, ethoxyquin, 2-phenoxyethanol, ethylene oxide, sodium chlorite, folpet, sodium hypochlorite, formic acid, sodium lauroylsarcosinate, phthalide, fuberidazole, sodium mercaptobenzothiazole, 2-mercaptobenzothiazole, sodium perborate, furazolidone, sodium percarbonate, pentanedial, sodium salicylate sulfadimethoxine, glycin, sulfamethazine, glyoxal, sulfamerazine, sulfamethoxazole, guaiacol, sulfameter, sulfamonomethoxine, sulfisoxazole gantrisin, bromol, hexachlorophene, 2-(thiocyanatomethylthio)benzothiazole, trichlorophenol, hydrogen peroxide, DBDCB, thiabendazole, ambam, trisodium 4-carboxy-5-mercapto-3-hydroxyisothiazole, anilazine, thiophanate-methyl, benomyl, tribromsalan, mancozeb, triclosan, maneb, mebenil, metham-sodium, quinaldine, zinc ethylenebisdithiocarbamate, captafol, zinc bis dimethyldithiocarbamate, captan, milneb, carbendazim, carboxin, NABAM, chloramphenicol, chlorotetracycline, cetrimonium pentachlorophenoxide, dihydrostreptomycin, lisozima, oxytetracycline, colistin sulfate, tetracycline, thiamphenicol, 5-chloro-2-methyl-4-isothiazolin-3-one, pentachlorophenol, chlorothalonil, pentachlorophenol copper, clotrimazole, isothiazolinones, dimethyloldimethyl hydantoin, 5-chloro-2-methyl-4-isothiazolin-3-one, 2-methyl-4-isothiazolin-3-one hydrochloride, nisin, or a mixture thereof.

6. The wood adhesive of claim 1, wherein said viscosity modifier is konjac glucomannan, xanthan gum, sodium alginate, hydroxypropyl starch, propyleneglycol alginate, gelatin, cyclohexapentylose, pectin, carrageenan, agar, gellan gum, arabic gum, tian-jing gum, carfopol resin, polyvinylpyrrolidone, dextrin, maltodextrin, chitosan, hydrolytic polymaleic anhydride, dimethyl sulfoxide, glycerol esters of wood rosin, glycerol esters of partially hydrogenated wood rosin, rosin modified maleic glyceride, hydrogenated rosin, polymerized rosin, disproportionated rosin, maleated rosin, rosin emulsion, petroleum resin emulsion, ployethylene wax, polyethylene glycol, polybutadiene, isocyanate, polyacrylamide, poly(vinyl alcohol), poly(1-butene), polyisobutylene, cellulose acetate butyrate, carboxymethyl cellulose, carboxymethylcellulose sodium, guar gum or a mixture thereof.

7. The wood adhesive of claim 1, wherein said filler is diatomite, kaolin, bentonite, talcum powder, glass wool, rock wool, glass flour, sand, sawdust, silica fume, microsilica, silica micropowder, light calcium carbonate, activated clay, cellulose, titanium pigment, wood fiber, or a mixture thereof.

8. The wood adhesive of claim 1, wherein said drier is diethylene glycol, glycerin, acetone, methanol, ethanol, industrial alcohol, methyl acetate, ethyl acetate, n-butanol, isobutanol, benzoic sulfimide, or a mixture thereof.

9. A method for preparing a wood adhesive of claim 1, comprising adding with stirring between 3 and 45 weight parts of a proteinaceous material, between 0.01 and 15 weight parts of an acidity regulator, between 0.01 and 15 weight parts of an aromatic compound, between 0.01 and 15 weight parts of a curing agent, between 0.01 and 15 weight parts of a preservative, between 0 and 15 weight parts of a viscosity modifier, between 0 and 10 weight parts of a filler, and between 0 and 15 weight parts of a drier to water.

10. The method of claim 9, wherein said method comprises
a) adding between 0 and 15 weight parts of said viscosity regulator to water, heating to between 10 and 100° C., and stirring so that said acidity regulator is completely dissolved, swollen, or dispersed;
b) cooling to not more than 70° C.; and
c) adding with stirring between 3 and 45 weight parts of said proteinaceous material, between 0.01 and 15 weight parts of said acidity regulator, between 0.01 and 15 weight parts of said aromatic compound, between 0.01 and 15 weight parts of said curing agent, between 0.01 and 15 weight parts of said preservative, between 0 and 10 weight parts of said filler, and between 0 and 15 weight parts of said drier.

11. The method of claim 9, further comprising homogenizing a resultant wood adhesive by a colloid mill and/or a homogenizer into an aqueous solution, and spray drying said aqueous solution to yield a powder.

12. The method of claim 9, wherein a granularity of said proteinaceous material is between 30 and 200 mesh.

13. The method of claim 9, wherein a stir speed is between 10 and 200 rpm.

14. The wood adhesive of claim 1, wherein said acidity regulator is butane tetracarboxylic acid, citric acid, tartaric acid, glutaric acid, lactic acid, quinic acid, malonic acid, itaconic acid, lauric acid, malonic acid, glutaric acid, sodium citrate, pyruvic acid, malic acid, or a mixture thereof.

15. The wood adhesive of claim 1, wherein said preservative is potassium sorbate, ethylparaben, propionic acid, benzoic acid, sodium benzoate, salicylic acid, dichlofluanid, salicylanilide, folpet, ethoxy quinoline, fumaric acid, sulfisoxazole gantrisin, glycidol, or a mixture thereof.

16. The wood adhesive of claim 1, wherein said viscosity modifier is xanthan gum, guar gum, carfopol resin, sesbania gum, polyvinyl alcohol, pectin, dimethyl sulphoxide, polyvinylpyrrolidone, petroleum resin emulsion, polyethylene wax, chitosan, hydrogenated rosin, glycerol ester of wood rosin, dextrin, or a mixture thereof.

17. The wood adhesive of claim 1, wherein said proteinaceous material is defatted cottonseed meal, soy protein isolate, glutin, defatted peanut meal, defatted soybean meal, bone glue, defatted soy meal, defatted castor meal, skim milk powder, rice protein, cell protein, defatted egg powder, meat and bone meal, defatted whey powder, or a mixture thereof.

18. The wood adhesive of claim 1, wherein said proteinaceous material is defatted cottonseed meal powder; said acidity regulator is butane tetracarboxylic acid; said aromatic compound is resorcine; said curing agent is ammonium chloride; said preservative is potassium sorbate; said filler is diatomite; and said dryer is acetone.

19. The wood adhesive of claim 1, wherein said proteinaceous material is defatted cottonseed meal powder; said acidity regulator is butane tetracarboxylic acid; said aromatic compound is resorcine; said curing agent is ammonium chloride; said preservative is potassium sorbate; said viscosity modifier is xanthan gum; said filler is diatomite; and said dryer is acetone.

20. The wood adhesive of claim 1, wherein said proteinaceous material is soy protein isolate; said acidity regulator is citric acid; said aromatic compound is maltol; said curing agent is potassium pyrosulfate; and said preservative is ethylparaben.

21. The wood adhesive of claim 1, wherein said proteinaceous material is glutin; said acidity regulator is tartaric acid; said aromatic compound is a tannin extract; said curing agent is sodium sulfite; said preservative is propionic acid; said viscosity modifier is guar gum; said filler is kaolin; and said dryer is glycerin.

22. The wood adhesive of claim 1, wherein said proteinaceous material is defatted peanut meal; said acidity regulator is glutaric acid; said aromatic compound is phenol; said curing agent is sodium dihydrogen phosphate; said preservative is benzoic acid; and said dryer is ethyl acetate.

23. The wood adhesive of claim 1, wherein said proteinaceous material is a mixture of defatted soybean meal and bone glue; said acidity regulator is lactic acid; said aromatic compound is sodium dodecyl benzene sulfonate; said curing agent is sodium tetraborate; said preservative is sodium benzoate; said viscosity modifier is a mixture of carfopol resin and sesbania gum; and said filler is a mixture of talcum powder and rock wool.

24. The wood adhesive of claim 1, wherein said proteinaceous material is a mixture of defatted soy meal flour and soy protein isolate; said acidity regulator is citric acid; said aromatic compound is tannin; said curing agent is a mixture of sodium hypophosphite and sodium tetraborate; said preservative is salicylic acid; and said viscosity modifier is polyvinyl alcohol.

25. The wood adhesive of claim 1, wherein said proteinaceous material is defatted castor meal; said acidity regulator is a mixture of quinic acid and malonic acid; said aromatic compound is a mixture of tannin and maltol; said curing agent is a mixture of sodium bisulfate and ferric sulfate; said viscosity modifier is a mixture of xanthan gum and pectin; said filler is glass flour; and said dryer is diethylene glycol.

26. The wood adhesive of claim 1, wherein said proteinaceous material is a mixture of defatted castor meal and skim milk; said acidity regulator is a mixture of itaconic acid and quinic acid; said aromatic compound is a mixture of resorcino and dimethyl phthalate; said curing agent is a mixture of sodium bisulfate and sodium silicate; said viscosity modifier is a mixture of dimethyl sulphoxide and polyvinylpyrrolidone; said filler is glass flour; and said dryer is ethyl acetate.

27. The wood adhesive of claim 1, wherein said proteinaceous material is rice protein; said acidity regulator is lauric acid; said aromatic compound is a mixture of thymol and dinaphthol; said curing agent is triethylamine; said preservative is dichlofluanid; said viscosity modifier is dimethyl sulfoxide; said filler is activated clay; and said dryer is glycerin.

28. The wood adhesive of claim 1, wherein said proteinaceous material is a mixture of cell protein and defatted egg powder; said acidity regulator is a mixture of tartaric and malonic acid; said aromatic compound is octylphenol; said curing agent is a mixture of triethylenetetramine and 3,3',4,4'-benzo-phenonetetracarboxylic dianhydride; said preservative is a mixture of salicylanilide and folpet; said viscosity modifier is petroleum resin emulsion; said filler is a mixture of cellulose and kaolin; and said dryer is methyl acetate.

29. The wood adhesive of claim 1, wherein said proteinaceous material is meat and bone meal; said acidity regulator is a mixture of glutaric acid and sodium citrate; said aromatic compound is m-nitrophenol; said curing agent is a mixture of 2-dodecen-1-ylsuccinic anhydride and decanedihydrazide; said preservative is ethoxy quinoline; said viscosity modifier is a mixture of polyethylene wax and chitosan; said filler is titanium dioxide; and said dryer is methanol.

30. The wood adhesive of claim 1, wherein said proteinaceous material is a mixture of defatted whey power and corn protein powder; said acidity regulator is pyruvic acid; said aromatic compound is a mixture of p-chlorophenol and catechol; said curing agent is chlorendic anhydride; said preservative is a mixture of fumaric acid and sulfisoxazole gantrisin; said viscosity modifier is a mixture of hydrogenated rosin and glycerol ester of wood rosin; said filler is talcum powder; and said dryer is a mixture of diethylene glycol and ethanol.

31. The wood adhesive of claim 1, wherein said proteinaceous material is a mixture of bone glue and skim milk powder; said acidity regulator is a mixture of malic acid and azelaic acid; said aromatic compound is a mixture of dihydroxytoluene and xylene; said curing agent is ammonium perchlorate; said preservative is glycidol; said viscosity modifier is dextrin; said filler is silicon powder; and said dryer is acetone.

32. A wood adhesive, comprising:
a) 100 weight parts of water;
b) between 3 and 45 weight parts of a proteinaceous material;
c) between 0.01 and 15 weight parts of an acidity regulator;
d) between 0.01 and 15 weight parts of an aromatic compound;
e) between 0.01 and 15 weight parts of a curing agent;
f) between 0.01 and 15 weight parts of a preservative;
g) between 0 and 15 weight parts of a viscosity modifier;
h) between 0 and 10 weight parts of a filler;
i) between 0 and 15 weight parts of a drier;
wherein said proteinaceous material comprises more than 5 wt. % of protein, and said proteinaceous material is defatted cottonseed meal, soy protein isolate, glutin, defatted peanut meal, defatted soybean meal, bone glue, defatted soy meal, defatted castor meal, skim milk powder, rice protein, cell protein, defatted egg powder, meat and bone meal, defatted whey powder, corn protein powder, or a mixture thereof;
said aromatic compound is tannin, a tannin extract, resorcine, maltol, phenol, sodium dodecyl benzene sulfonate, resorcino, dimethyl phthalate, thymol, dinaphthol, octylphenol, m-nitrophenol, p-chlorophenol, catechol, dihydroxytoluene, xylene, or a mixture thereof; and
said curing agent is ammonium chloride, potassium pyrosulfate, sodium sulfite, sodium dihydrogen phosphate, sodium tetraborate, sodium hypophosphite, sodium bisulfate, ferric sulfate, sodium silicate, triethylamine, 3,3',4,4'-benzophenonetetracarboxylic dianhydride, 2-dodecen-1-ylsuccinic anhydride, decanedihydrazide, chlorendic anhydride, ammonium perchlorate, or a mixture thereof.

33. A wood adhesive, comprising:
a) 100 weight parts of water;
b) between 3 and 45 weight parts of a proteinaceous material;
c) between 0.01 and 15 weight parts of an acidity regulator;
d) between 0.01 and 15 weight parts of an aromatic compound;
e) between 0.01 and 15 weight parts of a curing agent;
f) between 0.01 and 15 weight parts of a preservative;
g) between 0 and 15 weight parts of a viscosity modifier;
h) between 0 and 10 weight parts of a filler;
i) between 0 and 15 weight parts of a drier;
wherein
said proteinaceous material comprises more than 5 wt. % of protein, and said proteinaceous material is defatted cottonseed meal, soy protein isolate, glutin, defatted peanut meal, defatted soybean meal, bone glue, defatted soy meal, defatted castor meal, skim milk powder, rice protein, cell protein, defatted egg powder, meat and bone meal, defatted whey powder, corn protein powder, or a mixture thereof;
said acidity regulator is butane tetracarboxylic acid, citric acid, tartaric acid, glutaric acid, lactic acid, quinic acid, malonic acid, itaconic acid, lauric acid, malonic acid, glutaric acid, sodium citrate, pyruvic acid, malic acid, azelaic acid, or a mixture thereof;
said aromatic compound is tannin, a tannin extract, resorcine, maltol, phenol, sodium dodecyl benzene sulfonate, resorcino, dimethyl phthalate, thymol, dinaphthol, octylphenol, m-nitrophenol, p-chlorophenol, catechol, dihydroxytoluene, xylene, or a mixture thereof; and
said curing agent is ammonium chloride, potassium pyrosulfate, sodium sulfite, sodium dihydrogen phosphate, sodium tetraborate, sodium hypophosphite, sodium bisulfate, ferric sulfate, sodium silicate, triethylamine, 3,3',4,4'-benzophenonetetracarboxylic dianhydride, 2-dodecen-1-ylsuccinic anhydride, decanedihydrazide, chlorendic anhydride, ammonium perchlorate, or a mixture thereof.

* * * * *